United States Patent Office 3,812,108
Patented May 21, 1974

3,812,108
CATIONIC DYESTUFFS, THEIR MANUFACTURE
AND USE
Alfred Brack, Leverkusen, and Walter Gomm, Cologne,
Germany, assignors to Bayer Aktiengesellschaft, Leverkusen, Germany
No Drawing. Filed July 17, 1972, Ser. No. 272,174
Claims priority, application Germany, July 17, 1971,
P 21 35 834.9
Int. Cl. C07d 27/38
U.S. Cl. 260—240.9     8 Claims

ABSTRACT OF THE DISCLOSURE

Cationic dyestuffs of the formula

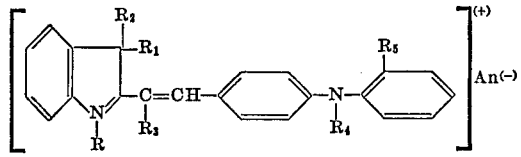

wherein R denotes an alkyl, aryl or aralkyl group, $R_1$, $R_2$ and $R_4$ denote an alkyl group, or $R_1$ and $R_2$ conjointly denote a carbocyclic ring, $R_3$ denotes hydrogen or an alkyl group, $R_5$ denotes an alkyl or alkoxy group and $An^{(-)}$ denotes an Anion, are used for dyeing and printing natural and synthetic materials.

---

The subject of the present invention are cationic dyestuffs of the general formula

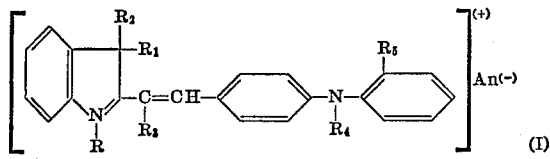

wherein
R denotes an alkyl, aryl or aralkyl group,
$R_1$ denotes an alkyl group,
$R_2$ denotes an alkyl group or $R_1$ and $R_2$ conjointly denote a carbocyclic ring,
$R_3$ denotes hydrogen or an alkyl group,
$R_4$ denotes an alkyl group,
$R_5$ denotes an alkyl or alkoxy group and $An^{(-)}$ denotes an anion, wherein the cyclic and acylic radicals may contain non-ionic substituents and/or carboxyl groups, and the processes for the manufacture of these dyestuffs, their use for dyeing and printing natural and synthetic materials, and materials dyed and printed with these dyestuffs.

Amongst these dyestuffs, those of the general formula

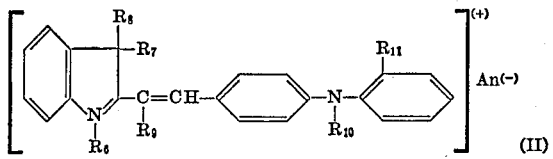

should be highlighted, wherein $R_6$ denotes an alkyl group with 1 to 4 C atoms or a phenyl or benzyl group, $R_7$ denotes an alkyl group with 1 to 4 C atoms,
$R_8$ denotes an alkyl group with 1 to 4 C atoms or $R_7$ and $R_8$ together with the C atom 3 of the indole ring denote a cyclopentane or cyclohexane ring,
$R_9$ denotes hydrogen or an alkyl group with 1 to 4 C atoms,
$R_{10}$ denotes an alkyl group with 1 to 4 C atoms,
$R_{11}$ denotes an alkyl group with 1 to 4 C atoms or an alkoxy group with 1 to 4 C atoms and
$An^{(-)}$ denotes an anion, and wherein the cyclic and acylic radicals can contain nonionic substituents and/or carboxyl groups.

Preferred dyestuffs are those of the general formula

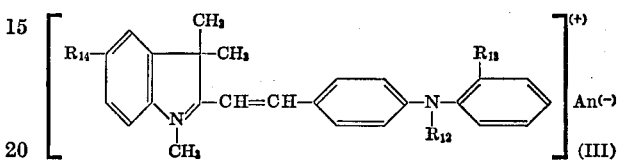

wherein $R_{12}$ denotes methyl or ethyl,
$R_{13}$ denotes methyl, ethyl, methoxy or ethoxy,
$R_{14}$ denotes hydrogen, an alkyl radical with 1 to 4 C atoms, an alkoxy radical with 1 to 4 C atoms, an alkylcarbonylamino radical with 1 to 4 C atoms in the alkyl radical, an alkoxycarbonyl radical with 1 to 4 C atoms in the alkyl radical, a nitrile or aminocarbonyl group or halogen and
$An^{(-)}$ denotes an anion.

Particularly preferred dyestuffs are those of the general formula

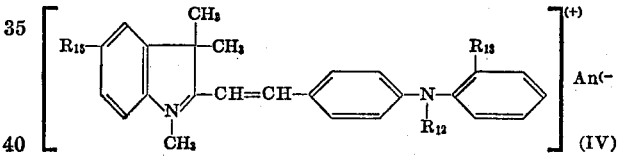

wherein $R_{12}$ denotes methyl or ethyl,
$R_{13}$ denotes methyl, ethyl, methoxy or ethoxy,
$R_{15}$ denotes hydrogen, methyl or chlorine and
$An^{(-)}$ denotes an anion.

Non-ionic substituents in the sense of the present invention are the non-dissociating substituents which are customary in dyestuff chemistry, such as fluorine, chlorine and bromine; alkyl groups, especially straight-chain or branched alkyl radicals with 1–6 C atoms; aralkyl radicals; alkenyl radicals; aryl radicals; alkoxy radicals, especially alkoxy radicals with 1–4 C atoms; aralkoxy radicals; aryloxy radicals; alkylthio radicals, preferably alkylthio radicals with 1–3 C atoms; aralkylthio radicals; arylthio radicals; nitro; nitrile; alkoxycarbonyl, preferably those with an alkoxy radical with 1–4 C atoms; the formyl radical; alkylcarbonyl radicals, especially those with an alkyl group with 1–4 C atoms; arylcarbonyl; aralkyl-carbonyl radicals; alkoxycarbonyloxy radicals, preferably with an alkyl group with 1–4 C atoms; alkylcarbonylamino radicals, preferably with an alkyl group with 1–4 C atoms; arylcarbonylamino radicals; alkylsulphonylamino radicals, preferably with an alkyl group with 1–3 C atoms; arylsulphonylamino groups; ureido;

N-aryl- or N-alkyl-ureido, aryloxycarbonylamino and alkyloxycarbonylamino; carbamoyl; N - alkyl - carbamoyl; N,N-dialkylcarbamoyl; N-alkyl - N - arylcarbamoyl; sulphamoyl; N-alkylsulphamoyl; N,N-dialkylsulphamoyl; alkylsulphonyl; alkenylsulphonyl; aralkylsulphonyl, with preferably 1–4 C atoms being present in the alkyl radicals mentioned; arylsulphonyl, carboxylic acid alkyl ester, carboxylic acid aryl ester, sulphonic acid alkyl ester and sulphonic acid aryl ester groups.

By an alkyl group there is understood a branched or unbranched, saturated or unsaturated aliphatic group with 1–6 C atoms which can contain non-ionic substituents and/or carboxyl groups, for example the methyl, ethyl, n- and isopropyl, n-, iso- and tert.-butyl and the various isomeric pentyl and hexyl groups, as well as the vinyl, allyl or propenyl group.

Possible anionic radicals $An^-$ are the organic and inorganic anions which are customary for cationic dyestuffs.

Inorganic anions are, for example, fluoride, chloride, bromide and iodide, perchlorate, hydroxyl, radicals of S-containing acids, such as hydrogen sulphate, sulphate, disulphate and aminosulphate; radicals of nitrogen-oxygen acids, such as nitrate; radicals of oxygen-acids of phosphorus, such as dihydrogen-phosphate, hydrogenphosphate, phosphate and metaphosphate; radicals of carbonic acid such as bicarbonate and carbonate; further anions of oxygen-acids and complex acids, such as methosulphate, ethosulphate, hexafluorosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of the methyl-phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethyl-sulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethyl-glycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(isotridecyloxy)-diethyleneglycol-ether-propionic acid, the ether-propionic acid of an alcohol mixture with 6 to 10 carbon atoms, thioacetic acid, 6-benzoylamino-2-chlorocaproic acid, nonyl-phenoltetraethyleneglycol-ether-propionic acid, nonylphenoldiethyleneglycol-ether-propionic acid, dodecyltetraethylene-glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 of Shell), a mixture of aliphatic carboxylic acids with 15 to 19 carbon atoms (Versatic Acid 1519 of Shell), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl-ether-$\alpha,\alpha'$-dicarboxylic acid, methylene-bis-thioglycollic acid, dimethylsulphide - $\alpha,\alpha$ - dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2 - chloroethanesulphonic acid and 2-hydroxyethanesulphonic acid and Mersolate, that is to say $C_8$–$C_{15}$ paraffinsulphonic acid obtained by chlorosulphonation of paraffin oil.

Suitable anions of cycloaliphatic carboxylic acids are, for example, the anions of cyclohexanecarboxylic acids and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy - 3 - methylbenzoic acid, 4-ethylmercapto-2-chlorobenzoic acid, 2 - hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Suitable anions of heterocyclic carboxylic acids are, for example, the anions of pyromucic acid, dehydromucic acid and indolyl-(3)-acetic acid.

Suitable anions of aromatic sulphonic acids are, for example, the anions of benzenesulphonic acid, benzene-1,3-disulphonic acid, 4-chlorobenzenesulphonic acid, 3-nitrobenzenesulphonic acid, 6 - chloro-3 - nitrobenzenesulphonic acid, toluene-4-sulphonic acid, toluene-2-sulphonic acid, toluene-$\omega$-sulphonic acid, 2-chlorotoluene - 4 - sulphonic acid, 1-hydroxybenzenesulphonic acid, n-dodecylbenzenesulphonic acid, 1,2,3,4 - tetrahydronaphthalene-6-sulphonic acid, naphthalene - 1 - sulphonic acid, naphthalene-1,4-disulphonic acid or -1,5-disulphonic acid, naphthalene-1,3,5-trisulphonic acid, 1-naphthol - 2 - sulphonic acid, 5-nitronaphthalene-2-sulphonic acid, 8-aminonaphthalene - 1 - sulphonic acid, stilbene-2,2'-disulphonic acid and biphenyl-2-sulphonic acid.

A suitable anion of heterocyclic sulphonic acids is, for example, the anion of quinoline-5-sulphonic acid.

Further possibilities are the anions of arylsulphinic, arylphosphonic and arylphosphonous acids, such as benzenesulphinic and benzenephosphonic acids.

Colorless anions are preferred. For dyeing from an aqueous medium, those anions which do not excessively impair the solubility of the dyestuff in water are preferred. For dyeing from organic solvents, those anions which promote the solubility of the dyestuff in organic solvents or at least do not affect it adversely are frequently also preferred.

The anion is in general determined by the manufacturing process and by the purification of the crude dyestuff which may be carried out. In general, the dyestuffs are present as halides (especially as chlorides or bromides) or as methosulphates, ethosulphates, sulphates, benzenesulphonates or toluenesulphonates or as acetates. The anions can be replaced, in a known manner, by other anions.

The new dyestuffs can be manufactured according to processes which are in themselves known, by condensing compounds of the general formula

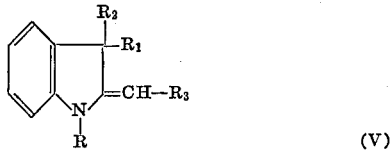

(V)

wherein the radicals have the meaning indicated in the formula I, or salts of these compounds, with aldehydes of the general formula

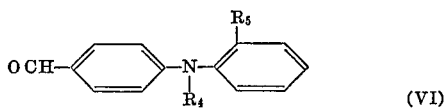

(VI)

wherein the radicals have the meaning indicated in the formula (I), or with their functional derivatives in an acid medium which yields an anion $An^{(-)}$, or in the presence of a condensation agent which yields an anion $An^{(-)}$, optionally with the addition of an inert diluent.

A variant of the process consists of producing the aldehydes (VI) or their functional derivatives from amines of the formula

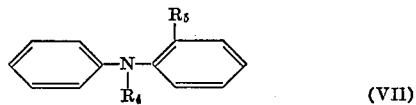

(VII)

in situ, for example under the conditions of the Vilsmeier aldehyde synthesis, and immediately reacting them further with the compounds (V).

A further manufacturing process for the dyestuffs (I) consists of the reaction of aldehydes of the general formula

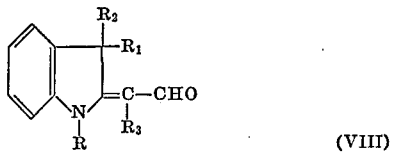

(VIII)

wherein the radicals have the meaning indicated in the formula (I), or of their functional derivatives, with the amines (VII) in the presence of a condensation agent which yields an anion $An^{(-)}$, optionally with the addition of an inert diluent.

A variant of this process consists of producing the aldehydes (VIII) or their functional derivatives from the compounds (V) in situ, for example under the conditions of the Vilsmeier aldehyde synthesis, and to react them immediately with the amines (VII).

Suitable functional aldehyde derivatives are, for example, primary products of the Vilsmeier reaction, enamines, acetals, mercaptals, nitrones, oximes, phenylhydrazones, semicarbazones, Schiff's bases and gem. dihalogen compounds.

Suitable acid condensation media are organic and inorganic acids such as acetic acid, propionic acid, chloroacetic, dichloroacetic and trichloroacetic acid, hydrochloric acid, sulphuric acid, phosphoric acid and polyphosphoric acid as well as mixtures of such acids. If organic acids are used, acid anhydrides, such as acetic anhydride, can also be added.

Suitable condensation agents are acid halides such as phosphorus oxychloride, phosphorus trichloride, thionyl chloride or phosgene. Such condensation agents can at the same time serve as solvents or diluents; however, the conjoint use of an inert diluent such as chlorobenzene, chloroform, carbon tetrachloride, ethylene chloride, perchloroethylene or nitrobenzene is frequently to be preferred. The condensation is carried out at about 50–150° C., preferably at about 75–120° C. The dyestuffs are isolated in the usual manner, for example by diluting the condensation mixture with water and adding sodium chloride or zinc chloride solution or by distilling off the inert diluents with steam and salting out the aqueous dyestuff solution thereby produced.

Suitable indoline derivatives (V) are, for example, 1,3,3-trimethyl-2-methylene-indoline, 1,3,3,5- and 1,3,3,7-tetramethyl-, 1,3,3-trimethyl-5-ethyl-, -7-ethyl-, -5-methoxy-, -7-methoxy-, -5-ethoxy-, -5-n-butoxy-, -5-benzyloxy-, -5-β-cyanoethoxy-, -5-β-chloroethoxy-, -5-acetylamino-, -5-chloro-, -7-chloro-, -5-trifluoromethyl-, -5-fluoro-, -5-methoxycarbonyl- and -7-ethoxycarbonyl-2-methylene-indoline, 1,3,3,4,6- and 1,3,3,5,7-pentamethyl-2-methyleneindoline, 1,3,3,5-tetramethyl-7-chloro- and -7-methoxy-2-methyleneindoline, 1-ethyl - 3,3 - dimethyl-2-methylene-indoline, 1-β-cyanoethyl-, 1-β-chloroethyl- and 1-β-hydroxyethyl-3,3-dimethyl-2-methylene-indoline, 1-n-butyl-, 1-benzyl- and 1-phenyl-3,3-dimethyl-2-methylene-indoline and 1,3,3-triethyl-2-methylene-indoline as well as the corresponding 2-ethylidene- and 2-n-propylidene-indolines.

Suitable diphenylamine-aldehydes (VI) are, for example, the monoaldehydes produced by application of the Vilsmeir reaction to N-methyl-, N-ethyl-, N-β-cyanoethyl-, N-β-chloroethyl-, N - n - butyl-, N - benzyl- and N-allyl-2-methyl-diphenylamine, -2-ethyl-diphenylamine, -2-methoxy - diphenylamine, -2-ethoxy - diphenylamine, -2-isopropoxy-diphenylamine and -2-n-butoxy-diphenylamine.

The new dyestuffs are distinguished by particularly good solubility in water and polar organic solvents. They are suitable for dyeing and printing materials of leather, tannin-treated cotton, cellulose, synthetic polyamides and polyurethanes and fibres containing lignin. They are furthermore suitable for the manufacture of writing fluids, inks for rubber stamps and pastes for ball pens and can also be used in flexographic printing.

In particular, however, the dyestuffs according to the invention are suitable for dyeing—from an aqueous liquor or from organic solvents—and printing filaments, tapes, woven fabrics or knitted fabrics of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene, or flocks, fibres, filaments, tapes, woven fabrics or knitted fabrics of acid-modified aromatic polyesters as well as acid-modified polyamide fibres. Acid-modified aromatic polyesters are, for example, polycondensation products of sulphoterephthalic acid and ethylene glycol, that is to say polyethylene glycol terephthalates containing sulphonic acid groups (type Dacron 64 of E. I. du Pont de Nemours and Company), such as are described in Belgian Patent Specification No. 549,179 and U.S.A. patent specification 2,893,816.

Dyeing can be carried out from a weakly acid liquor, in which case the goods are appropriately introduced into the dye-bath at 40–60° C. and are then dyed at the boil. It is also possible to dye under pressure at temperatures above 100° C. Furthermore, the dyestuffs can be added to spinning solutions for the manufacture of fibres containing polyacrylonitrile or be applied to the unstretched fibre.

The dyeings and prints are distinguished—especially on the last-mentioned materials—by excellent fastness properties, above all fastness to light, wet processing, decatizing, sublimation, perspiration and rubbing, and in many cases by the extraordinary clarity of the color shade. The new dyestuffs show desirable resist effects, that is to say selected accompanying fibres, such as wool or polyester, are not dyed.

The known processes of dyeing or printing, including dyeing from organic solvents (for example chlorinated hydrocarbons) can be used for applying the dyestuffs to the materials to be dyed.

is used and the procedure is otherwise unchanged, very clear, fast dyestuffs are again obtained:

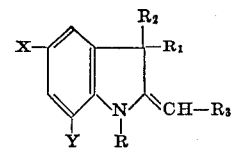

| R | $R_1$ | $R_2$ | $R_3$ | X | Y | Color shade on polyacrylonitrile |
|---|---|---|---|---|---|---|
| Methyl | Methyl | Methyl | Hydrogen | Methyl | Hydrogen | Red. |
| Do | do | do | do | Ethyl | do | Red. |
| Do | do | do | do | Hydrogen | Ethyl | Red. |
| Do | do | do | do | iso-Propyl | Hydrogen | Red. |
| Do | do | do | do | n-Butyl | do | Red. |
| Do | do | do | do | iso-Propoxy | do | Strongly bluish-tinged red. |
| Do | do | do | do | Methoxy | Methoxy | Do. |
| Do | do | do | Methyl | Hydrogen | Hydrogen | Red. |
| Ethyl | do | do | Hydrogen | do | do | Red. |
| n-Butyl | do | do | do | do | do | Red. |
| β-Chloroethyl | do | do | do | do | do | Bluish-tinged red. |
| β-Cyanoethyl | do | do | do | do | do | Do. |
| β-Hydroxyethyl | do | do | do | do | do | Do. |
| Benzyl | β-Hydroxyethyl | β-Hydroxyethyl | do | do | do | Do. |
| Methyl | Ethyl | Ethyl | do | do | do | Red. |
| Do | Methyl | Methyl | do | Fluorine | do | Red. |
| Do | do | do | do | Trifluoromethyl | do | Bluish-tinged red. |
| Do | do | do | do | Methylsulphonylamino | do | Do. |
| Do | do | do | do | Methoxycarbonylamino | do | Do. |
| Do | do | do | do | Hydrogen | Chlorine | Do. |
| Do | do | do | do | do | Methoxycarbonyl | Do. |
| Do | do | do | do | do | Hydroxycarbonyl | Do. |
| Do | do | do | do | Hydroxycarbonyl | Hydrogen | Strongly bluish-tinged red. |
| Do | $R_1+R_2$=tetramethylene | | do | Hydrogen | do | Red. |
| Do | $R_1+R_2$=pentamethylene | | do | do | do | Red. |

The parts indicated in the examples are parts by weight and the temperatures are given in degrees centigrade.

EXAMPLE 1

22.5 parts of the aldehyde of the formula

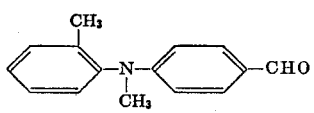

and 17.5 parts of 1,3,3-trimethyl - 2 - methylene-indoline ("Fischer base"), 80 parts of glacial acetic acid and 10 parts of acetic anhydride are warmed to about 100° for 4 hours. The cooled mixture is diluted with 900 parts of water and 50 parts of sodium chloride are added. The dyestuff which separates out can be purified by redissolving in water, with the addition of active charcoal, and reprecipitating. It corresponds to the formula

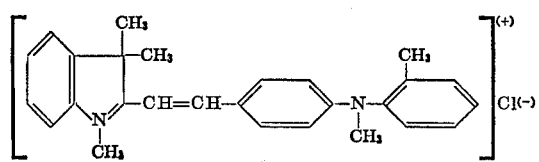

and dyes polyacrylonitrile in a luminous red having very good fastness properties.

The aldehyde used was manufactured as follows: 19.6 parts of N-methyl-2-methyldiphenylamine are mixed with 11 parts of dimethylformamide and 20 parts of phosphorus oxychloride are added at 50–60° over the course of ¼ hour. The mixture is stirred overnight at 70–80° and is then poured out into 300 parts of water. The oil which separates out is taken up in chlorobenzene, washed with water and distilled in vacuo. 16.7 parts of N-methyl-2-methyldiphenylamine-4'-aldehyde are obtained in the form of a pale yellow, viscous oil of boiling point 197–200°/2.8 mm. Hg.

If instead of the "Fischer base" the particular equivalent amount of one of the following indoline derivatives

EXAMPLE 2

20.1 parts of 1,3,3-trimethyl-2-formylmethyleneindoline ("Fischer base aldehyde") and 21.1 parts of N-methyl-2-ethyldiphenylamine together with 80 parts of chloroform and 50 parts of phosphorus oxychloride are heated to the boil for approx. 8 hours. The mixture is then poured into 1,000 parts of water and the chloroform is separated off. The dyestuff which separates out can be purified by redissolving in water, with the addition of active charcoal and reprecipitating. The dyestuff obtained corresponds to the formula

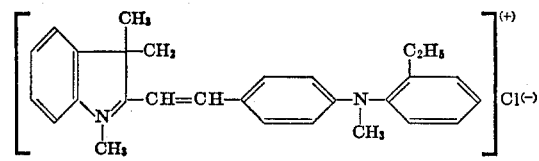

and dyes polyacrylonitrile fabric in a luminous red having very good fastness properties.

EXAMPLE 3

16 parts of N-methyl-2-methyldiphenylamine are mixed with 15 parts of dimethylformamide and reacted with 13 parts of phosphorus oxychloride in ¼ hour at approx. 50°. The batch is stirred for some hours longer at 70–80° and diluted with 20 parts of glacial acetic acid, and 16 parts of 5-chloro-1,3,3-trimethyl-2-methyleneindoline are added at approx. 50°. The batch is stirred for a further 5 hours at 70–80° and poured into 700 parts of water, and the product is salted out with 140 parts of sodium chloride and filtered off. The dyestuff can be purified by redissolving in water with the addition of active charcoal and reprecipitating. The resulting dyestuff corresponds to the formula

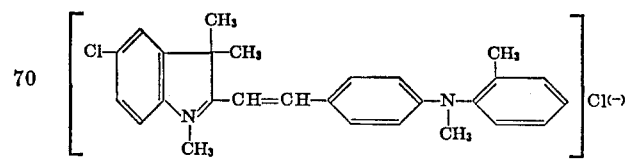

and dyes polyacrylonitrile fabric in a brilliant bluish-tinged red having very good fastness properties.

If instead of N-methyl-2-methyldiphenylamine the particular equivalent amount of N-ethyl-, N-n-propyl-, N-n-butyl-, N-allyl, N-β-chloroethyl-, N-β-methoxyethyl-, N-β-ethoxyethyl- or N-β-cyanoethyl-2-methyl-diphenylamine is used and the procedure is otherwise unchanged, fast clear dyestuffs of a similar color shade are again obtained.

EXAMPLE 4

24.1 parts of the aldehyde of the formula

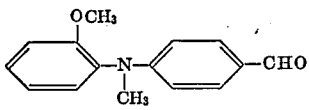

and 17.3 parts of 1,3,3-trimethyl-2-methylene-indoline are warmed with 50 parts of glacial acetic acid and 5 parts of concentrated hydrochloric acid to about 105° for 4 hours. The cooled mixture is diluted with 500 parts of 6% strength sodium chloride solution. The dyestuff, which separates out in approximately quantitative yield, corresponds to the formula

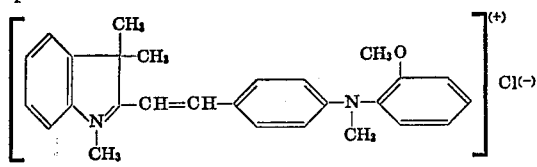

and dyes polyacrylonitrile in a bluish-tinged red having very good fastness properties.

The aldehyde used was manufactured in accordance with the instructions in Example 1. After recrystallization from cyclohexane, it melts at 66°. The equivalent amount of the analogous ethoxy-aldehyde (melting point=90°) can also be employed in its place; a tinctorially very similar dyestuff of corresponding structure is then obtained.

EXAMPLE 5

Polyacrylonitrile fibres are introduced, using a liquor ratio of 1:40, into an aqueous bath at 40° which contains, per liter, 0.75 g. of 30% strength acetic acid, 0.38 g. of sodium acetate and 0.15 g. of the dyestuff of the formula

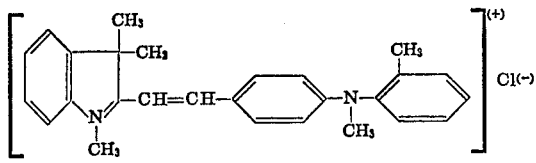

The bath is heated to the boil over the course of 20–30 minutes and kept at this temperature for 30–60 minutes. After rinsing and drying, a red dyeing having very good fastness properties is obtained.

EXAMPLE 6

A polyacrylonitrile fabric is printed with a printing paste which was manufactured as follows:

30 parts by weight of the dyestuff of the formula

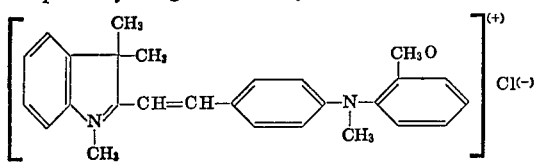

50 parts by weight of thiodiethylene glycol, 30 parts by weight of cyclohexanol and 30 parts by weight of 30% strength acetic acid are covered with 330 parts by weight of hot water and the resulting solution is added to 500 parts by weight of dextrin (gum arabic as a thickener). Finally, 30 parts by weight of zinc nitrate solution are also added. The resulting print is dried, steamed for 30 minutes and subsequently rinsed. A bluish-tinged red print having very good fastness properties is obtained.

EXAMPLE 7

Acid-modified polyglycol terephthalate fibres are introduced, using a liquor ratio of 1:40, into an aqueous bath at 20° which contains, per liter, 3 to 10 g. of sodium sulphate, 0.1–1 g. of oleyl-polyglycol-ether (50 mols of ethylene oxide), 0–15 g. of dimethylbenzyldodecylammonium chloride and 0.15 g. of the dyestuff of Example 6 and which has been adjusted to pH 4–5 with acetic acid. The bath is heated to 100° over the course of 30 minutes and kept at this temperature for 60 minutes. Thereafter the fibres are rinsed and dried. A bluish-tinged red dyeing having very good fastness properties is obtained.

EXAMPLE 8

0.055 g. of the dyestuff of Example 5 are worked into a paste with a 20-fold amount of hot water, with the addition of a little acetic acid, in a dyeing beaker of 500 ml. capacity located in a heated water bath, and the paste is dissolved by means of hot water. The dyeing liquor is additionally treated with 0.5 g. of the reaction product of 50 mols of ethylene oxide with 1 mol of oleyl alcohol and is made up to 500 ml. with cold water. The pH value of the dyeing liquor is adjusted to 4.5–5 with acetic acid or sodium acetate.

10 g. of piece goods of acid-modified polyamide are constantly agitated in this dyeing liquor whilst raising the temperature to 100° over the course of 15 minutes. The material is dyed at the boil for 15–20 minutes, rinsed with cold water and subsequently dried, for example by ironing or in a drying cabinet at 60–70°. A material dyed a brilliant red is obtained.

We claim:

1. Dyestuff of the formula

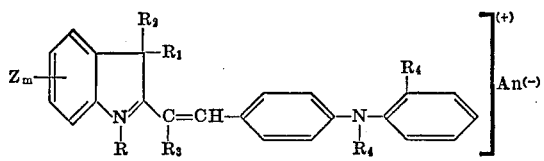

R is phenyl, benzyl, or alkyl of 1–4 carbon atoms, unsubstituted or substituted with cyano, chloro or hydroxy;

$R_1$ is alkyl of 1–4 carbon atoms, unsubstituted or substituted with hydroxy;

$R_2$ is alkyl of 1–4 carbon atoms, unsubstituted or substituted with hydroxy;

$R_1$ and $R_2$ together additionally are tetramethylene or pentamethylene;

$R_3$ is hydrogen, methyl or ethyl;

$R_4$ is benzyl, allyl or alkyl of 1–4 carbon atoms, unsubstituted or substituted with cyano or chloro;

$R_5$ is alkyl of 1–4 carbon atoms or alkoxy of 1–4 carbon atoms;

Z is alkyl of 1–6 carbon atoms, unsubstituted or substituted with fluoro; alkoxy of 1–4 carbon atoms, unsubstituted or substituted with cyano or chloro; benzyloxy; halogen; hydroxycarbonyl; alkoxycarbonyl of 1–4 carbon atoms in the alkoxy radical, methylsulfonylamino, alkylcarbonylamino of 1–4 carbon atoms in the alkyl radical, or alkoxycarbonylamino of 1–4 carbon atoms in the alkoxy radical;

$m$ is 0, 1 or 2; and

An is an anion.

2. Dyestuff of the formula

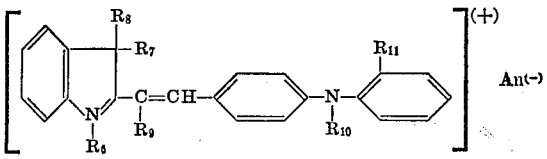

wherein $R_6$ denotes an alkyl group with 1 to 4 C atoms or a phenyl or benzyl group,
$R_7$ denotes an alkyl group with 1 to 4 C atoms,
$R_8$ denotes an alkyl group with 1 to 4 C atoms or $R_7$ and $R_8$ together with the C atom 3 of the indole ring denote a cyclopentane or cyclohexane ring,
$R_9$ denotes hydrogen or an alkyl group with 1 to 4 C atoms,
$R_{10}$ denotes an alkyl group with 1 to 4 C atoms,
$R_{11}$ denotes an alkyl group with 1 to 4 C atoms or an alkoxy group with 1 to 4 C atoms and
$An^{(-)}$ denotes an anion.

3. Dyestuff of the formula

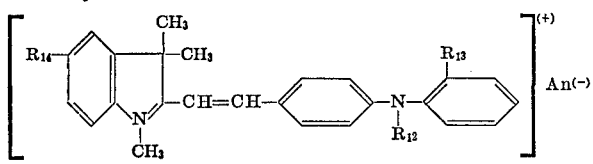

wherein $R_{12}$ denotes methyl or ethyl,
$R_{13}$ denotes methyl, ethyl, methoxy or ethoxy,
$R_{14}$ denotes hydrogen, an alkyl radical with 1 to 4 C atoms, an alkoxy radical with 1 to 4 C atoms, an alkylcarbonylamino radical with 1 to 4 C atoms in the alkyl radical, an alkoxycarbonyl radical with 1 to 4 C atoms in the alkyl radical, a nitrile or aminocarbonyl group or halogen and
$An^{(-)}$ denotes an anion.

4. Dyestuff of the formula

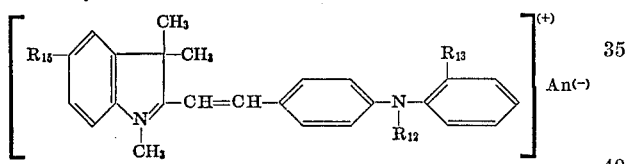

wherein $R_{12}$ denotes methyl or ethyl,
$R_{13}$ denotes methyl, ethyl, methoxy or ethoxy,
$R_{15}$ denotes hydrogen, methyl or chlorine and
$An^{(-)}$ denotes an anion.

5. A dyestuff of the formula

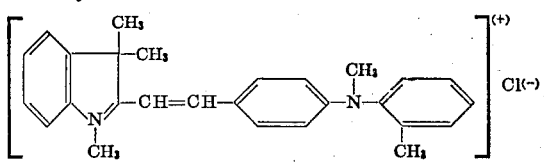

6. A dyestuff of the formula

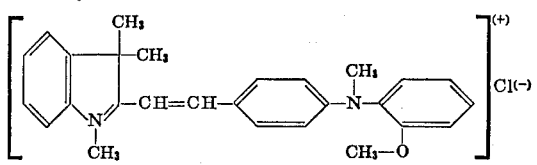

7. A dyestuff of the formula

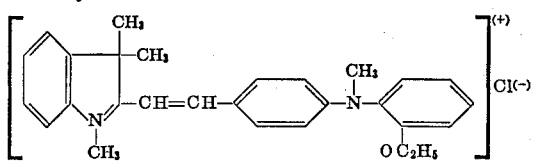

8. A dyestuff of the formula

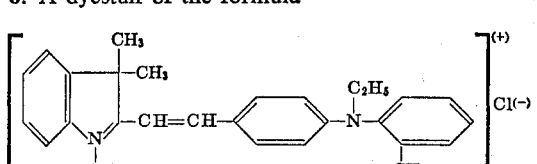

References Cited

UNITED STATES PATENTS 2,242,474    5/1941    Kochendoerfer et al.
                                                260—240.9
2,350,393    6/1944    Eistert et al. _____ 260—240.9

JOHN D. RANDOLPH, Primary Examiner

U.S. Cl. X.R.

8—54.2, 62, 63, 177 R, 178 R, 179; 106—22; 260—326.11 R

UNITED STATES PATENT OFFICE
CERTIFICATE OF CORRECTION

Patent No. 3,812,108      Dated May 21, 1974

Inventor(s) Alfred Brack et al

It is certified that error appears in the above-identified patent and that said Letters Patent are hereby corrected as shown below:

Column 10, Line 38, Claim 1, in the formula,

"
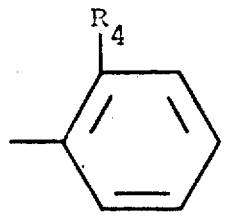
"

should read

---
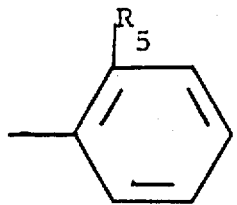
---

Signed and sealed this 11th day of March 1975.

(SEAL)
Attest:

RUTH C. MASON
Attesting Officer

C. MARSHALL DANN
Commissioner of Patents
and Trademarks